United States Patent [19]

Syme

[11] Patent Number: 4,466,419
[45] Date of Patent: Aug. 21, 1984

[54] COOKING METHOD AND APPARATUS FOR USE WITH WOOD-BURNING STOVE

[75] Inventor: Duncan C. Syme, Chelsea, Vt.

[73] Assignee: Vermont Castings, Inc., Randolph, Vt.

[21] Appl. No.: 213,952

[22] Filed: Dec. 8, 1980

[51] Int. Cl.³ ............................................. F24C 1/14
[52] U.S. Cl. ........................................... 126/4; 126/2; 126/9 R; 126/26; 126/218
[58] Field of Search .................... 126/4, 6, 9 R, 137, 126/136, 135, 2, 3, 29, 211, 218, 147, 157, 148, 28, 27

[56] References Cited

U.S. PATENT DOCUMENTS

| | | | |
|---|---|---|---|
| 50,231 | 10/1865 | Dunham | 126/4 |
| 103,715 | 5/1870 | Buys | 126/2 |
| 245,962 | 8/1881 | Loomis | 126/26 |
| 438,141 | 10/1890 | Brown | 126/28 |
| 626,485 | 6/1899 | Bruneau | 126/26 |
| 747,100 | 12/1903 | Stockon | 126/2 |
| 790,166 | 5/1905 | Wood-Allen | 126/147 |
| 961,291 | 6/1910 | Fogelquist | 126/300 |
| 1,526,340 | 2/1925 | Hjorth | 126/300 |
| 2,274,229 | 2/1942 | Althoff | 126/4 |
| 2,519,263 | 8/1950 | Lucas | 126/147 |
| 3,952,721 | 4/1976 | Patterson | 126/4 |
| 4,211,206 | 7/1980 | Darbo | 126/9 R |
| 4,221,207 | 9/1980 | Syme | 126/77 |

FOREIGN PATENT DOCUMENTS

| | | | |
|---|---|---|---|
| 367377 | 2/1921 | Fed. Rep. of Germany | 126/147 |
| 84218 | 6/1921 | Fed. Rep. of Germany | 126/28 |
| 460720 | 12/1913 | France | 126/4 |

Primary Examiner—James C. Yeung
Attorney, Agent, or Firm—Kenway & Jenney

[57] ABSTRACT

A solid fuel burning heating apparatus, used as a parlor stove, is also used for cooking. The stove is provided with a self-clearing top smoke chamber having a top cover over an aperture. A cooking tray is supported in the aperture when the stove is operating. The tray has a surface for holding coals and an opening communicating between the aperture and the interior of the stove. A perforate cooking surface is supported above the tray.

26 Claims, 12 Drawing Figures

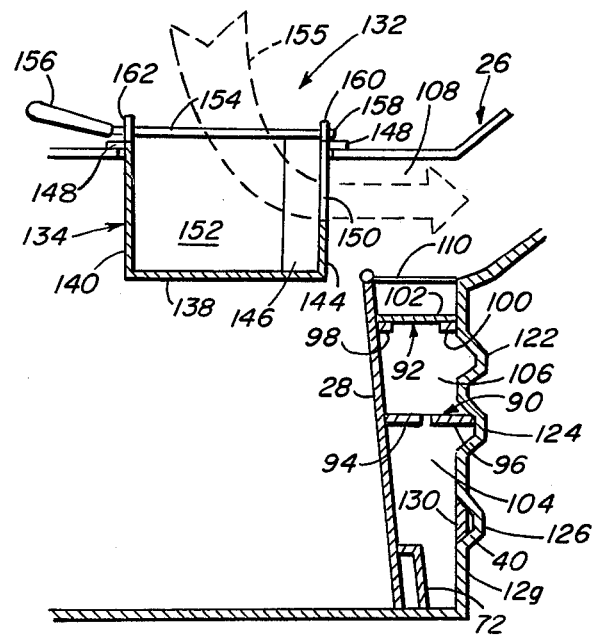
FIG. 9
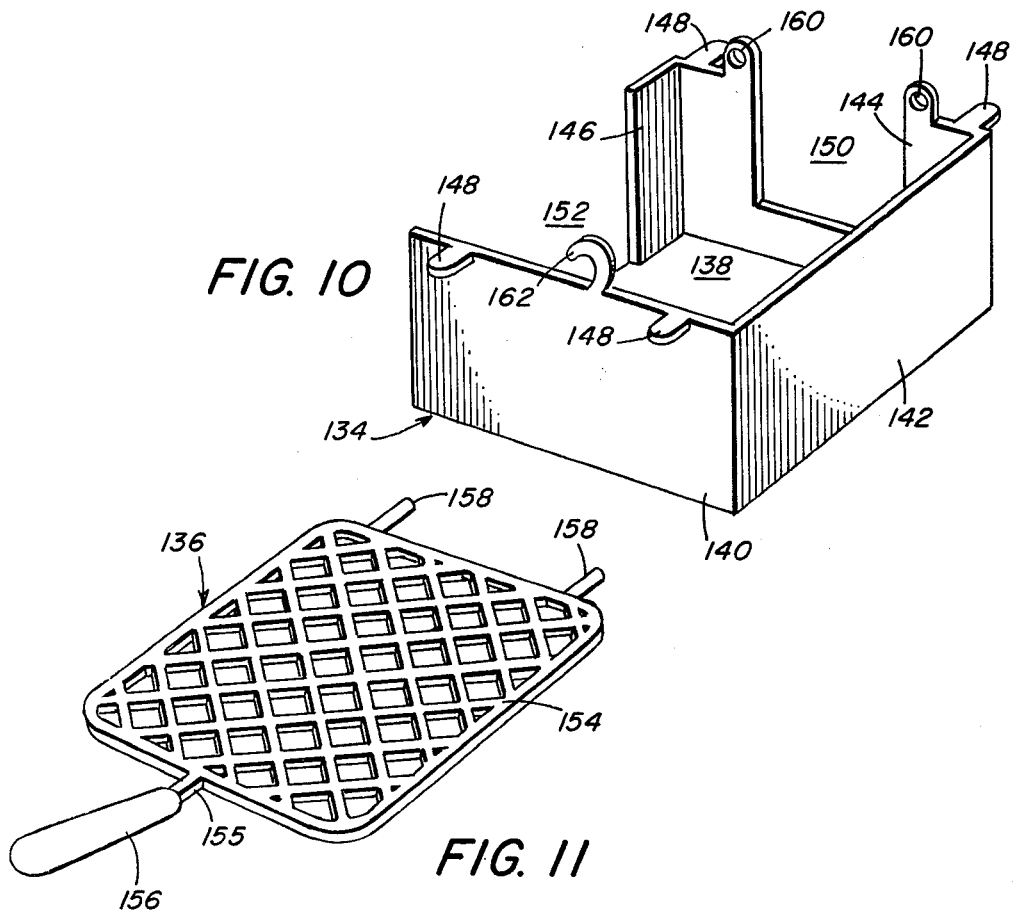
FIG. 10
FIG. 11

COOKING METHOD AND APPARATUS FOR USE WITH WOOD-BURNING STOVE

BACKGROUND OF THE INVENTION

The invention relates generally to heating apparatus and in particular to cooking adapted to a wood-burning heating apparatus.

Heat from burning fuel is, of course, a traditional medium for cooking food, and cooking over an open fire is undoubtedly the earliest method of cooking. Although ovens and broilers are used for certain kinds of cooking, much cooking is still done atop open sources of heat such as gas or electric ranges.

Open cooking produces a certain amount of cooking odor and gaseous and solid by-products, that can rise to an annoying and uncomfortable level. Many gas and electric stoves are accompanied by overhead hoods for drawing up and exhausting such products. Some are equipped with passages built into the surface of the stove, with fans for drawing cooking by-products down into the stove openings and exhausting them.

The enclosed fire in a wood burning stove transmits enough heat to the frame of the stove so that a stove surface, usually the top, can also be used as a source of heat for cooking. Cooking on top of a wood stove, however, also produces the cooking odors and other gaseous and solid cooking by-products mentioned above.

A principal object of the invention is to provide a method and apparatus for cooking in conjunction with solid fuel burning stoves like the one described hereinafter, namely, one with a top loading capability which requires that a downdraft through the top loading aperture be maintained if wood is loaded while the fire is lit.

Further objects of the invention are to provide an apparatus and a method for using a wood burning stove for cooking while maintaining the room free of cooking odors and, in the case of the apparatus, which is easy to use and inexpensive to manufacture.

SUMMARY OF THE INVENTION

The apparatus of the invention features, in wood-burning apparatus having a fuel-containing member enclosing a combustion chamber, in which the frame member has a panel with a coverable aperture, and the frame member has, in addition, a combustion products exit aperture positioned in relation to the panel aperture so that air is drawn in through the panel aperture while wood is burning and the aperture is uncovered, a food cooking assembly supported in operative relation to the panel aperture for drawing cooking by-products through the panel aperture into the frame member. The food cooking assembly comprises a food cooker adapted for insertion at least partially into the aperture and support for the food cooker so placed.

The invention also features use of the top panel of the stove, as the apertured panel and a cooking assembly including a coal-holding tray having bottom and side walls adapted to be inserted into the aperture. The tray walls define an opening communicating between the panel aperture and the exit aperture, and also a coal aperture for reintroducing coals in the tray back into the combustion chamber. A cooking surface made up of a perforate planar cast iron member is supported above the tray.

The method of the invention uses a wood-burning heating apparatus having a frame enclosing a combustion chamber and a frame aperture in communication with the combustion chamber, a downdraft flowing through the uncovered aperture when wood is burning in the combustion chamber. The method includes the steps of uncovering the frame aperture, placing a cooking surface on which food can be cooked in an operative relation to the frame aperture, providing a heat source in operative relation to the cooking surface, and providing an unimpeded communication between the cooking surface and the combination chamber so that cooking byproducts will be carried by the downdraft through the frame aperture in the combustion chamber. The method also features providing a coals support surface assembly beneath the cooking surface, and providing a passageway in the coals support surface for reintroducing the coals to the combustion chamber.

DESCRIPTION OF THE DRAWINGS

Other features, objects, and advantages of the invention will appear from the following description of a preferred embodiment taken together with the drawings, in which:

FIG. 9 is a view like that of FIG. 8, showing a cooking assembly according to the invention inserted into the aperture at the top of the stove described in the other Figures;

FIG. 10 is a perspective view of a tray of the cooking assembly according to the invention; and FIG. 11 is a perspective view of a grill of the cooking assembly.

DESCRIPTION OF A PREFERRED EMBODIMENT

Figure 1:
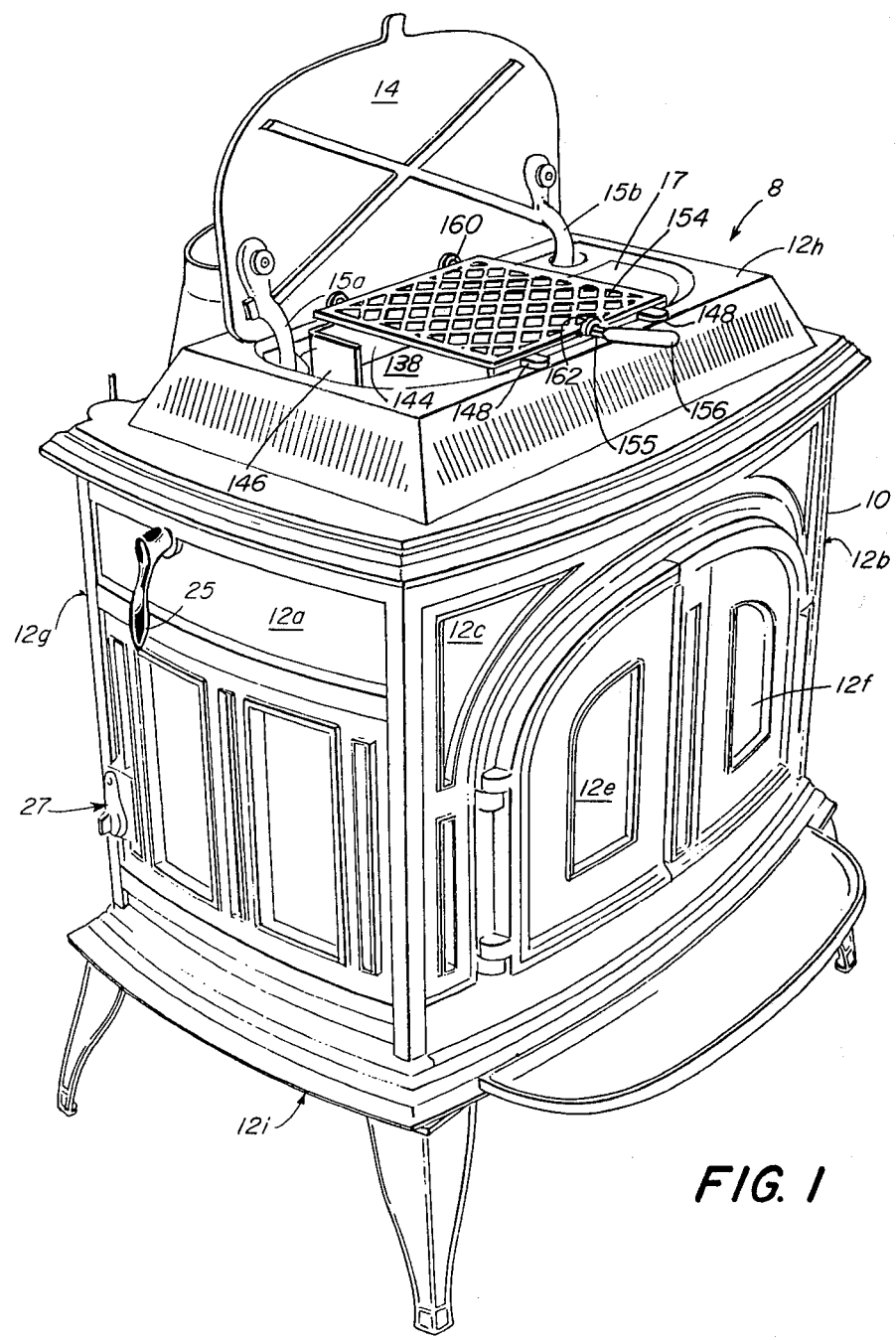
FIG. 1 is a front perspective view of a wood-burning stove.

Referring to FIG. 1, the wood-burning heating apparatus 8 has an exterior frame member 10 preferably comprised of a heavy-duty cast iron. The sides 12a, 12b, front 12c with doors 12e, 12f, back 12g, top 12h, and bottom 12i of the frame member are joined to form an integral air tight unit. The front pivoting doors 12e, 12f, allow the heating apparatus to be opened from the front for both loading of wood and for viewing the fire when the heating apparatus is used as a fireplace. A top cover 14 of the apparatus has hinges 15a, 15b which allow it to pivot to an upward position, whereby wood may be loaded into a primary combustion chamber 16 (FIG. 3) through a smokeless loading aperture 17. The aperture size is designed to sweep the opening clear of smoke when the top cover is pivoted to an open condition. Preferably the ratio of aperture cross-sectional area to the flue gas output exit cross-sectional area is about three to one. Thus, even when the stove is in operation, firewood may be reloaded merely by dropping wood into the primary combustion chamber. An seal around aperture 17 provides an air tight fit between cover 14 and the frame member.

Figure 2:
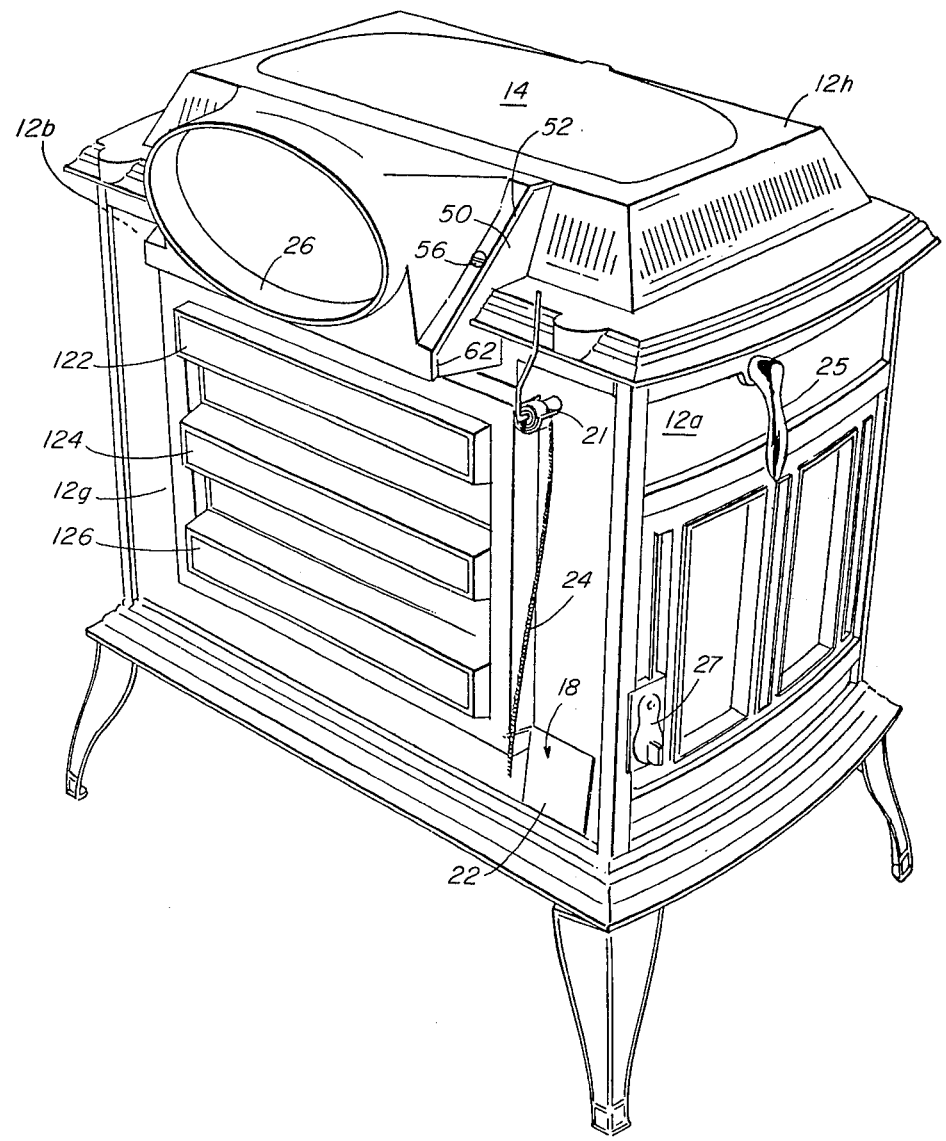
FIG. 2 is a rear perspective view of the stove of FIG. 1.
Figure 3:
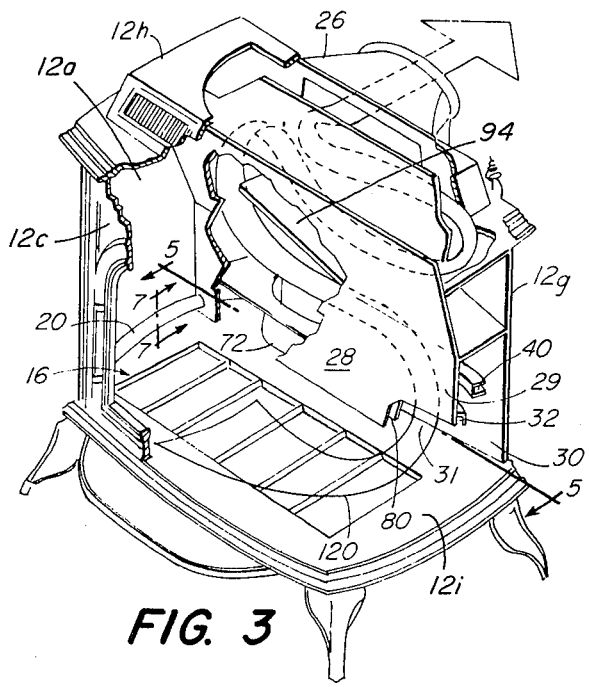
FIG. 3 is a cut-away front perspective view of the stove.

Referring to FIGS. 2 and 3, air is fed to the primary combustion chamber 16 through a primary inlet port 18 and a primary air supply flow path 20 (FIG. 3). Inlet port 18 is thermostatically controlled by a thermostat 21 which operates a damper 22 (FIG. 2) covering an aperture 23 (FIG. 6) in the back frame member 12g. Thermostat 21 is for example a 5" coil of bimetallic material connected to a damper 22 by a flexible chain 24. Heating apparatus 8 is also provided with a damper control lever 25, a rotatable flue member 26, and a manually controlled night air inlet port 27 in side member 12a.

Referring to FIG. 3, primary air travels through primary air supply path 20 after entering aperture 23 (see FIG. 6 for the relation between aperture 23 and air supply path 20) and is heated by the fire which surrounds the tubes. Thus, the primary air is preheated and helps to keep a hotter fire going with less air and wood consumed. The primary combustion chamber is bounded by the substantially vertically oriented downwardly extending fireback baffle 28, the side walls 12a and 12b of the frame member, the front doors 12e, 12f and front wall 12c of the frame member, and the top 12h and bottom 12i frame member panels (FIGS. 1, 2 and 3).

A right-hand portion 29 of baffle 28 further provides a partial separation between the primary combustion chamber 16 and a secondary combustion chamber 30. The secondary combustion chamber is connected to and is in gaseous communication with the primary combustion chamber through an opening 31 in baffle 28. A secondary air supply flow path 32 is provided for the secondary combustion chamber from thermostatically controlled inlet port 18, and comprises an imperforate section 36 (FIG. 5) which extends from the inlet port 18 to substantially the beginning of the secondary combustion chamber and a perforate or apertured conduit 38 which extends within the secondary combustion chamber along a bottom section of baffle 29 around opening 31. The nature of the secondary air supply is described in more detail below.

There is further provided a third air supply path 40 which may be used to provide air from manually controlled inlet 27 (FIGS. 1 and 2) to the secondary combustion chamber during night or other selected periods of low heat output operation. Air supply path 40 further provides additional oxygen for secondary combustion in the secondary combustion chamber.

Figure 5:
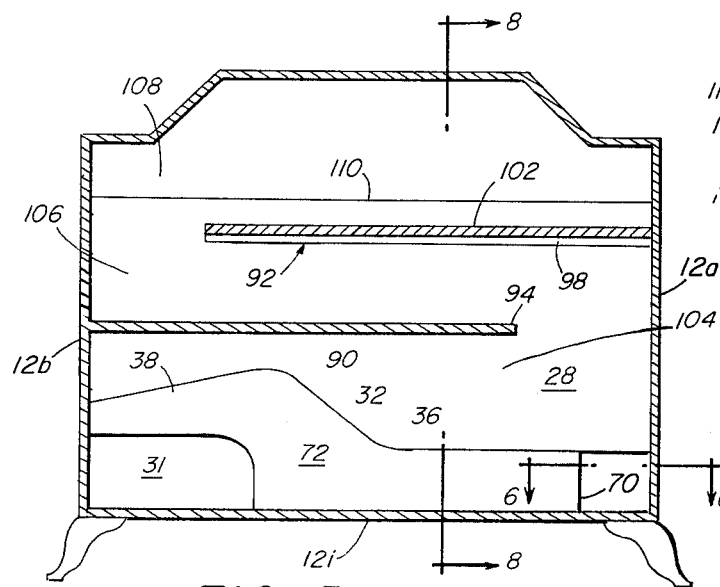
FIG. 5 is a cross-sectional view facing the back of the fireback baffle along lines 5—5 of FIG. 3.

Behind the fireback baffle 28 are a plurality of connecting smoke passages 104, 106, 108 (FIGS. 3 and 5). These passages direct the spent flue gases from the secondary combustion chamber to the left end of the apparatus (looking from the front), then into an upper channel or passage 106 and back toward the right portion of the stove, and then further up into an uppermost passage 108 and back toward the left portion of the stove, where they finally exit through the flue collar 26. The secondary combustion chamber, taken together with the smoke passages, make up the flame path. Since the heat of the flue gas is considerable, and is transferred to the surfaces of the stove as the flue gases traverse the passages, a significant amount of heat is given off to the room rather than being lost up the chimney. In addition, since the passages are adjacent to the primary combustion chamber, higher temperatures are maintained within the fire mass itself, which aids in burning the volatile gaseous products from the burning wood.

Figure 4B:
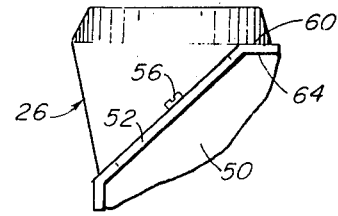
FIG. 4B is a cross-sectional schematic view of the rotatable flue collar in the top exit position.
Figure 4A:
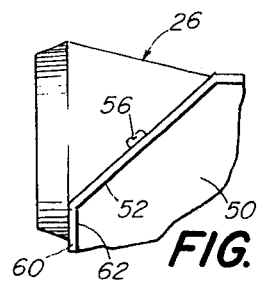
FIG. 4A is a cross-sectional schematic view of a rotatable flue collar of the stove in the rear exit position.

Referring to FIGS. 4A and 4B, flue collar 26 is preferably rotatable to allow operation of the apparatus with either a horizontal exit (FIG. 4A) or a vertical exit (FIG. 4B) position. The flue collar is attached to an inclined back portion 50 which is securely positioned on the back and top frame portions of the apparatus. The flue collar is secured to the inclined surface 52 of the back portion by two flue collar bolts 56 (only one of which is shown in the figures). The two bolts are secured on opposed sides of the flue collar.

Referring to FIG. 4A, an extended portion 60 of the flue collar contacts vertically oriented section 62 of the back portion 50 for additional orientation and alignment support. By removing the flue collar bolts (located on opposite sides of the flue), and rotating the flue collar 180°, the orientation shown in FIG. 4B may be obtained. This orientation provides the top exiting stove and is maintained by replacing the bolts 56. The extended portion 60 of the flue collar 26 is now positioned against the horizontally oriented section 64 of portion 50.

Figure 6:
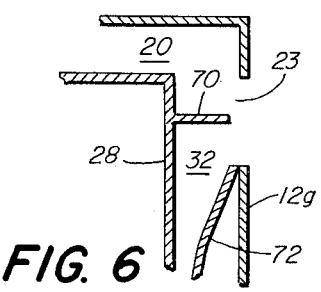
FIG. 6 is a cross-sectional view taken along lines 6—6 of FIG. 5.

Thermostatically controlled inlet port 18 (seen in FIG. 2 preferably supplies air for both the primary and secondary air flow paths. As shown in FIGS. 5 and 6, air enters through aperture 23 in frame back wall 12g and is almost immediately divided between the primary and secondary flow paths by a dividing plate member 70. That portion of the incoming air which passes into the secondary flow path 32 is directed along the fireback baffle 28 and is constrained to follow a path adjacent to the fireback baffle by an enclosing member 72. Enclosing member 72 not only directs the secondary air flow toward opening 31 in baffle 28, but, in order to provide a substantially uniform flow of air into opening 31, the cross-sectional area of the supply path defined by enclosing member 72 in combination with baffle 28 increases substantially as the path approaches the opening, as shown in FIG. 5. This provides the necessary volume distribution of the flow to promote substantially uniform air flow in the opening. At the opening 31, the enclosing member 72 ends in a substantially spaced apart parallel alignment with the baffle 28, for example, at 80 (FIG. 3) so that the flow of secondary air is substantially unimpeded into the secondary chamber at opening 31. The secondary air supplied at opening 31 is also preheated due to its proximity with baffle 28 so that the efficiency of the secondary combustion chamber is increased.

Figure 7:
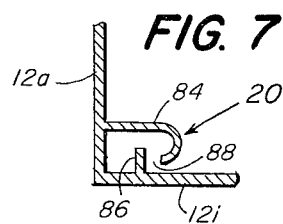
FIG. 7 is a cross-sectional view taken along lines 7—7 of FIG. 3.

That portion of the ambient air passing through aperture 23 which follows primary flow path 20 passes through the baffle 28 near the lower base of the baffle (FIG. 3) and is supplied to the primary combustion chamber along an open ended slotted conduit 20 which extends from baffle 28, along side wall 12a, and for approximately one-fifth the distance along the bottom of front wall 12c. The slotted conduit has a cross-sectional area which is substantially constant (FIG. 7). The conduit comprises a horizontally extending J-shaped element 84 and a vertically upwardly extending cast member 86 which together define the elongated slot 88. Primary air is thus provided to promote a uniform flow of combustion supporting oxygen across the entire depth of the combustion chamber.

Thus, the air provided by primary flow path 20 enters the primary combustion chamber along the bottom left-hand side of the chamber (looking from the front), and traverses the chamber toward the right-hand side providing combustion along the entire bottom of the wood supply. Upon reaching the right-hand portion of the apparatus, the air flow is directed toward and through opening 31 and exits through the circuitous flow path provided by the baffle arrangement extending between baffle 28 and rear wall 12g.

Figure 8:
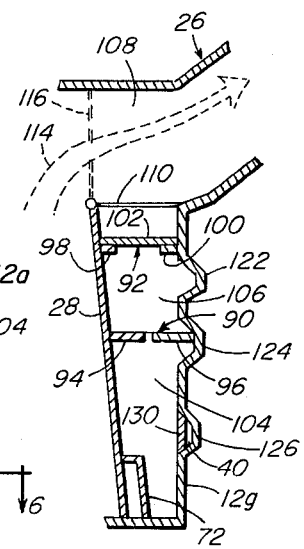
FIG. 8 is a cross-sectional view taken along lines 8—8 of FIG. 5.

Referring to FIGS. 5 and 8, the baffle arrangement for directing the flue gases along the circuitous path through the space between baffle 28 and back wall 12g comprises a lower baffle 90 and an upper baffle 92. Lower baffle 90 comprises two cast plate members 94 and 96 which meet along their length to form baffle 90 when the fireback baffle 28 is put into position. Baffle 90 extends substantially from side wall 12b to a position near side wall 12a. Baffle 92 extends above baffle 90 and comprises a pair of tabular cast supported members 98, 100 which support a baffle plate 102 extending substantially from side wall 12a to a position near side wall 12b. The flue gases thereby are directed from a first horizontally directed passage 104 to a second horizontally directed passage 106 and then to a third horizontally directed passage 108 from which they exist through the flue collar 26.

The heating apparatus is also provided with a damper 110 which enables the apparatus to be used both as a parlor stove and as a fireplace. In the position shown in FIG. 8, the open position, the apparatus can be used as a fireplace with the flue gases exiting from the primary combustion chamber along a path generally indicated by arrow 114. This provides updraft combustion. When the damper is closed, that is, placed in a position indicated by a dotted line 116, the heating apparatus operates as a stove and the flue gases exit substantially as shown by the arrow 120 (FIG. 3). (When fuel is loaded into the apparatus through aperture 17 the damper must be in the open position or otherwise smoke will pour out of the aperture 17 in the top panel 12h.)

Referring to FIGS. 2 and 8, back wall member 12g has a series of corrugations 122, 124, 126, which protrude outwardly from the plane of back wall member 12g. These corrugations provide additional heat radiation surfaces for the heating apparatus for increasing the heat delivery to the surrounding air. In addition, the corrugations provide convenient means for channeling "night air" from the manually controlled inlet port 27 to the secondary combustion chamber through night air flow path 40. Thus, the lowermost corrugation 126 is blocked off by a plate 130 and is used to channel the night air into at least towards the secondary combustion chamber.

In the preferred embodiment of the invention, the opening 31 (FIGS. 3 and 5) has a height of between 3 and 4¼ inches and is preferably 4 inches high. It has been found for the particular apparatus depicted in FIG. 3 that the height of opening 31 is important and a height substantially greater than 4 inches increases the heat output of the apparatus and also its conversion efficiency.

Referring to FIGS. 9, 10 and 11, there is shown a food cooking assembly 132 that can be used with the heating apparatus 8 described above. The cooking assembly 132 has two components, a tray 134 (see FIG. 10) and a grill 136 (see FIG. 11).

The tray 134 is configured generally to fit through the shape of the aperture 17 in the top panel, wall, 12h of the stove frame. It is made of a non-combustible, preferably metal, material, and in the preferred embodiment is made of stamped tin. As seen in FIG. 10, the tray 134 has a flat, horizontal bottom 138, and vertical walls at the front 140, right side 142, rear 144, and left side 146. Horizontal tabs 148 extending from the top of the front and rear walls 140, 144 engage the stove top and support the tray 134 therefrom in the stove aperture 17.

The rear wall 144 of the tray defines a substantial rear opening 150, and the illustrated left side wall 146 of the tray is in fact short, leaving a substantial side opening 152 in the tray. In effect, communication between the aperture 17 in the stove top 12h and the interior of the stove 8, and, eventually the flue collar 26, is maintained despite the presence of the tray 134 inserted into the aperture. The downdraft 155 that occurs when the cover 14 is lifted from the aperture 17 while the stove is in operation (and the damper 110 is in the appropriate position, namely, horizontal) to allow leading the stove with wood, is thus uninterrupted by insertion of the tray 134.

The grill 136 is cast iron in the preferred embodiment and provides an open cooking surface 154 made of a perforate planar member an and a shank 155 on which a handle 156 is mounted. The cooking surface, like the tray 134, is preferably made from metal, and includes a pair of rearward projections 158 which are insertable into vertical tabs 160 extending from the top of the tray rear wall 144 for support. A hook-like projection 162 extends upwardly from the front wall 140 of the tray to capture the handle 156 of the grill 136. After it has been inserted in the rear tabs 160.

To insert the cooking assembly 132 into its operative position, it is only necessary to open the cover 14 on top of the stove 8 and drop in the tray 134. The horizontal tabs 148 will support the tray 134 on the rim of the aperture 17, and the openings 150, 152 in the tray walls 144, 146, respectively, will continue to allow the downdraft that passes through aperture 17 when the damper 110 is in the horizontal position and the wood in the stove is burning.

After the tray 134 is in place, coals from burning wood are placed in the tray on the bottom 138. The grill 136 may then be placed appropriately by inserting the rear projections 158 into the tray vertical tabs 160 and capturing the grill handle 156 under the front tray hook 162. The grill 136 provides an open cooking surface 154 then, for food to be cooked over the hot coals in the tray 134 below. The cooking is inherently adjustable because more or less coals can be placed in the tray 134 until the desired heat level is reached. Gaseous and solid by-products of the cooking process will not escape into the air above the stove, but instead will be carried by the downdraft 155 into the interior combustion chamber of the stove (through the openings 150, 152 in the tray) and eventually out the exhaust flue 26 of the stove. After the food on the grill 136 is cooked and there is no longer any need for the coals in the tray 134, the coals can be pushed out tray opening 152 to rejoin the fire below.

The method of cooking just described takes advantage of the built-in downdraft natural devised for the stove 8 so that it could be loaded with wood fuel from the top 12h through aperture 17. It has long been known that it is desirable to exhaust, from the vicinity of cooked food, the gaseous and solid by-products of the cooking process. Cooking apparatus have been devised which mechanically draw air down below a cooking surface and discharge it elsewhere. Cooking on the hot surface of a wood-burning stove is, of course, an old custom. The invention, however, provides a method and apparatus for cooking in which the built-in downdraft of a top-loading stove is used to advantage. The particular form of the stove, or of the components of the cooking assembly may, of course, be varied without departing from the spirit of the invention.

Other embodiments of the invention, including additions, subtractions, deletions, and other modifications of the preferred embodiment of the invention will be obvious to one skilled in the art and are within the scope of the following claims.

I claim:

1. A solid fuel burning heating and cooking apparatus comprising:
   a fuel-containing frame member enclosing a combustion chamber,
   said frame member having an apertured panel for defining a panel aperture in said frame member, and means for covering said aperture,
   said frame member further having means for defining a combustion products exit aperture, said exit aperture and said panel aperture having a positioned interrelationship with a ratio of the cross-sectional area of said panel aperture to the cross-sectional area of said combustion products exit aperture being sufficient to draw air by naturla draft through said panel aperture into said frame member while solid fuel is burning in said combustion chamber and said panel aperture is uncovered, and
   coverless apertured grill means for cooking food substantially unimpeded over a secondary fuel source, and means for supporting said grill means and said secondary fuel source in said frame member in the path of said natural draft through said panel aperture, said supporting means including a base for supporting said secondary fuel source and side portions connected to said base for supporting said grill means, said side portions defining an aperture through said supporting means, said apparatus utilizing said fuel-containing frame member's means for naturally drawing air through said panel aperture in order to draw cooking by-products through said panel aperture and into said frame member.

2. The apparatus of claim 1 wherein said apertured panel is a top panel of said frame member.

3. The apparatus of claim 1 wherein said cooking means comprises
   tray means including bottom and side walls adapted to be inserted into said frame member through said panel aperture,
   said tray means walls defining an opening communicating between said panel aperture and said exit aperture, said opening preventing impedance of the downdraft built into said frame member, and
   said tray means including a support member for engaging said apertured panel for supporting said tray means in said frame member.

4. The apparatus of claim 3 wherein said cooking means further comprises
   means for defining a cooking surface,
   said tray means further has means for supporting said cooking surface means above said tray means bottom, and
   said tray bottom being adpated to support hot coals in an operative relation to said cooking surface.

5. The apparatus of claim 4 wherein said means defining said cooking surface comprises a perforate planar member defining said cooking surface.

6. A solid fuel burning heating and cooking apparatus comprising:
   a fuel-containing frame member enclosing a combustion chamber,
   said frame member having an apertured panel for defining a panel aperture in said frame member, and means for covering said aperture, said aperture panel being a top panel of said frame member,
   said frame member further having means for defining a combustion products exit apertue, said exit aperture and said panel aperture having a positioned interrelationship with a ratio of the cross-sectional area of said panel aperture to the cross-sectional area of said combustion products exit aperture being sufficient to draw air by natural draft through said panel aperture into said frame member while solid fuel is burning in said combustion chamber and said panel aperture is uncovered, and
   means for cooking food supported in the path of said natural draft through said panel aperture, said apparatus utilizing said fuel-containing frame member's means for naturally drawing air through said panel aperture and into said frame member in order to draw cooking by-products through said panel aperture,
   said cooking means including,
   tray means including bottom and side walls adapted to be inserted into said frame member through said panel aperture,
   said tray means walls defining an opening communicating between said panel aperture and said exit aperture,
   said opening preventing impedence of the downdraft built into said frame member, and
   said tray means including a support member for engaging said apertured panel for supporting said tray means in said frame member.

7. The apparatus of claim 6 wherein said cooking means further comprises
   means for defining a cooking surface,
   said tray means further has means for supporting said cooking surface means above said tray means bottom, and
   said tray bottom being adapted to support a secondary solid fuel source in an operative relation to said cooking surface.

8. The apparatus of claim 7 wherein said means defining said cooking surface comprises a perforate planar member defining said cooking surface.

9. For use with a solid fuel burning heating apparatus having a top aperture in the combustion chamber enclosing frame of said apparatus and a combustion products exit aperture, and through which a natural downdraft flows when a primary solid fuel source is burning said combustion chamber and said top aperture is uncovered,
   a food cooking assembly comprising
   coverless apertured grill means for cooking food substantially unimpeded over a secondary fuel source, said grill means being adapted for insertion at least partially into said top aperture, including
   means positioned adjacent said top aperture for supporting said grill means and said secondary fuel source in the path of said natural draft through said top aperture said supporting means including a base for supporting said secondary fuel source and side portions connected to said base for supporting said grill means, said side portions defining an aperture through said supporting means, whereby by-products generated during said cooking are drawn into said combustion chamber.

10. The food cooking assembly of claim 9 wherein said cooking means comprises
tray means including bottom and side walls adapted to be inserted into said frame member through said top aperture,
said tray means walls defining an opening communicating between said top aperture and the interior of said heating apparatus, and
said tray means including a support member for engaging said top panel for supporting said tray means in said frame member.

11. The apparatus of claim 10 wherein said cooking means further comprises
means for defining a cooking surface,
said tray means further has means for supporting said cooking surface means above said tray means bottom, and
said tray bottom being adapted to support hot coals in an operative relation to said cooking surface.

12. The apparatus of claim 11 wherein said means defining said cooking surface comprises a perforate planar member pattern defining said cooking surface.

13. The apparatus of claim 10 wherein at least one of said tray side walls defines a coal aperture having a bottom boundry defined by said tray bottom.

14. The apparatus of claim 10 wherein at least one of said tray side walls facing said combustion products exit aperture defines a flowthrough aperture forming a communication passage between said top aperture and said exit aperture.

15. The apparatus of claim 10 wherein said tray side walls extend substantially from said tray bottom wall to said top aperture to close off said top aperture, except that
at least one of said tray side walls defines a coal aperture having a bottom boundary defined by said tray bottom, and
at least one of said tray side walls facing said combustion products exit aperture defines a flowthrough aperture forming a communication passage between said top aperture and said exit aperture.

16. For use with a solid fuel burning heating apparatus having a top aperture in the combustion chamber enclosing frame of said apparatus and a combustion products exit aperture, and through which a natural downdraft flows when solid fuel is burning in said combustion chamber and said top aperture is uncovered.
a food cooking assembly comprising
means for cooking food adapted for insertion at least partially into said top aperture, said cooking means including,
tray means including bottom and side walls adapted to be inserted into said frame member through said top aperture,
said tray means walls defining an opening communicting between said top aperture and the interior of said heating apparatus, and
said tray means including a support member for engaging said top panel for supporting said tray means in said frame member in operative relation to said aperture whereby by-products generated during said cooking are drawn into said combustion chamber.

17. The apparatus of claim 16 wherein said cooking means further comprises
means for defining a cooking surface,
said tray means further has means for supporting said cooking surface means above said tray means bottom, and
said tray bottom being adapted to support hot coals in an operative relation to said cooking surface.

18. The apparatus of claim 17 wherein said means defining said cooking surface comprises a perforate planar member pattern defining said cooking surface.

19. The apparatus of claim 16 wherein at least one of said tray side walls defines a coal aperture having a bottom boundary defined by said tray bottom.

20. The apparatus of claim 16 wherein at least one of said tray side walls facing said combustion products exit aperture defines a flowthrough aperture forming a communication passage between said top aperture and said exit aperture.

21. The apparatus of claim 16 wherein said tray side walls extend substantially from said tray bottom wall to said top aperture to close off said top aperture, except that
at least one of said tray side walls defines a coal aperture having a bottom boundary defined by said tray bottom, and
at least one of said tray side walls facing said combustion products exit aperture defines a flowthrough aperture forming a communication passge between said top aperture and said exit aperture.

22. A method of cooking food using a solid fuel burning heating apparatus having a frame enclosing a combustion chamber and a frame aperture in communication with said combustion chamber and having an inward flow through said aperture when a primary solid fuel source is burning in said combustion chamber and said aperture is uncovered, comprising the steps of
uncovering said frame aperture,
placing an apertured cooking surface, on which food can be cooked substantially unimpeded over a secondary fuel source, in an operative relation to said open frame aperture,
providing said secondary fuel source in operative relation to said cooking surface, and
providing an unimpeded communication between said surface and said combustion chamber whereby cooking by-products will be carried by said downdraft through said frame aperture into said chamber.

23. The method of claim 22 wherein said heat producing step comprises the step of
providing a coals support surface assembly beneath said cooking surface, said coal support surface including means to prevent the impedance of said downdraft between said surface and said combustion chamber, and
placing coals from said burning wood on said coals support surface.

24. The method of claim 23 further including the step of providing a passgeway in said coals support surface assembly to said combustion chamber for reintroducing the coals to the combustion chamber.

25. A method of cooking food using a solid fuel burning heating apparatus having a frame enclosing a combustion chamber and a frame aperture in communication with said combustion chamber and having an inward flow through said aperture when a primary solid fuel source is burning in said combustion chamber and said aperture is uncovered, comprising the steps of uncovering said frame aperture, placing an apertured cooking surface on which food can be cooked in an operative relation to said open frame aperture, providing a secondary solids fuel support surface assembly beneath said cooking surface, said secondary solid fuel support surface including means to prevent the impedance of said downdraft between said surface and said combustion chamber, and placing secondary solid fuel from said primary solid fuel source on said solid fuel support surface, and providing an unimpeded communication between said cooking surface and said combustion chamber whereby cooking by-products will be carried by said downdraft through said frame aperture into said chamber.

26. The method of claim 25 further including the step of providing a passageway in said secondary solid fuel support surface assembly to said combustion chamber for reintroducing the secondary solid fuel to the combustion chamber.

* * * * *